United States Patent
Lee

(10) Patent No.: US 6,794,833 B2
(45) Date of Patent: Sep. 21, 2004

(54) CIRCUIT AND METHOD FOR CONTROLLING DELAY OF DYNAMIC FOCUS SIGNAL

(75) Inventor: Jae-hoon Lee, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/359,954

(22) Filed: Feb. 6, 2003

(65) Prior Publication Data

US 2003/0164690 A1 Sep. 4, 2003

(30) Foreign Application Priority Data

Mar. 4, 2002 (KR) ......................................... 2002-11344

(51) Int. Cl.[7] ................................................ G09G 1/04
(52) U.S. Cl. ..................... 315/382; 315/382.1
(58) Field of Search ............................. 315/382, 382.1, 315/398, 403, 364, 405; G09G 1/04

(56) References Cited

U.S. PATENT DOCUMENTS 5,434,485 A * 7/1995 Kawashima et al. ..... 315/382.1
6,078,151 A * 6/2000 Kudo .......................... 315/382

* cited by examiner

Primary Examiner—Wilson Lee
Assistant Examiner—Trinh Vo Dinh
(74) Attorney, Agent, or Firm—Mills & Onello, LLP

(57) ABSTRACT

A circuit and a method for controlling a delay of a dynamic focus signal are provided. The delay control circuit includes a pulse center detecting circuit, a first delay control signal generating circuit, and a selection circuit. The pulse center detecting circuit generates a center detecting signal that detects a pulse center of a first pulse signal. The first delay control signal generating circuit generates a first delay control signal having a first logic level or a second logic level depending on the result of a comparison of a first comparative signal level generated in a form of a first degree function in response to the first pulse signal with a predetermined second comparative signal level. The selection circuit selects one of the center detecting signal and the first delay control signal in response to a predetermined selection signal and generates the selected signal as a second delay control signal that controls an amount of delay time of the dynamic focus signal. The delay control circuit further includes a digital-to-analog converter that generates the second comparative signal. A point at which the first delay control signal is generated is controlled in response to changes of the second comparative signal level. In the circuit and method for controlling a delay of a dynamic focus signal, an amount of delay time in the process where a dynamic focus signal is amplified in a CRT monitor is controlled.

20 Claims, 9 Drawing Sheets

CIRCUIT AND METHOD FOR CONTROLLING DELAY OF DYNAMIC FOCUS SIGNAL

BACKGROUND OF THE INVENTION

1. Field of the Invention

The present invention relates to a Cathode Ray Tube (CRT) monitor, and more particularly, to a circuit for controlling a delay of a dynamic focus signal in a CRT monitor.

2. Description of the Related Art

In general, an electron beam emitted from an electron gun has different driving distances to a central portion and an edge portion of a screen. As a result, the focus is not uniform over the entire screen. In particular, the focus at a central portion of the screen is different than the focus at an edge portion of the screen. To overcome this problem, a dynamic focus circuit, which applies different focus voltages to the central portion and to the edge portion of the screen, is required. A signal that is generated by the dynamic focus circuit is called a dynamic focus signal.

A dynamic focus signal is amplified to a relatively high voltage in order to drive a CRT monitor, but the dynamic focus signal is sometimes delayed in the amplification process.

Various kinds of video modes are used for a CRT monitor. Each video mode uses a different frequency. However, in a case where a dynamic focus signal is amplified, a delay time due to the amplification is always the same for all the video modes. Therefore, a complete focusing operation cannot be performed. That is, since a delay time (the delay time is below about 1 us) generated in the process where the dynamic focus signal is amplified is applied to each of the video modes at a different ratio, it is necessary to compensate for a delay time in each video mode individually. This can be a serious problem.

FIG. 1 is a block diagram showing a delay control circuit for controlling delays in a conventional dynamic focus signal. The conventional delay control circuit 100 includes a horizontal deflection transformer 110, a shaping pulse generating circuit 120 and a selection circuit 130. The horizontal deflection transformer 110 generates a fly-back signal (SFB). The fly-back signal (SFB) controls the location of an electronic beam on a CRT monitor. The electronic beam moves from the left to the right of the screen in order to output information on the screen of the CRT monitor. When the electronic beam moves to the end of the screen, it moves to the starting point of the screen in order to output the next screen. The signal which controls these movements is referred to as a fly-back signal (SFB).

The fly-back signal (SFB) generated by the horizontal deflection transformer 110 cannot have a shaped pulse form but is generated in a uniformly shaped pulse waveform by the shaping pulse generating circuit 120.

The selection circuit 130 selects one of the rising edge or the center point of the fly-back signal (SFB1) with a shaping pulse form in response to a selection signal (SEL) and generates a delay control signal (DECTRLS).

FIG. 2 is a block diagram of a circuit which generates a dynamic focus signal (DFS) in response to the delay control signal (DECTRLS) of FIG. 1.

A mono stable circuit 210 converts an input signal into a pulse form. When the delay control signal (DECTRLS) is converted into a pulse waveform by the mono stable circuit 210 and is input to a serration wave generating circuit 220, the serration wave generating circuit 220 generates serration waves (STS) to generate a dynamic focus signal. The serration wave generating circuit 220 is charged by receiving current from the exterior and is discharged when the delay control signal (DECTRLS) is input. The serration wave generating circuit 220 is discharged by the delay control signal (DECTRLS) and is charged by receiving current from the exterior when a voltage reaches a certain reference level. In this way, a serration wave signal (STS) is output.

The dynamic focus signal generating circuit 230 receives the output signal (STS) of the serration wave generating circuit 220 and generates a dynamic focus signal (DFS) having the form of a parabola. The dynamic focus signal (DFS) can be generated by squaring the output serration wave signal (STS) of the serration wave generating circuit 220.

FIG. 3 is a waveform diagram showing a relationship between the fly-back signal and the dynamic focus signal.

FIG. 3(i) shows the serration wave signal (STS) and the dynamic focus signal (DFS) in a case where the center of the shaped fly-back signal (SFB1) is selected. FIG. 3(ii) shows the serration wave signal (STS) and the dynamic focus signal (DFS) in a case where the rising edge of the shaped fly-back signal (SFB1) is selected.

As shown in FIG. 3, only a center or a rising edge of the fly-back signal (SFB1) is selected as a point at which the dynamic focus signal (DFS) is generated. Therefore, delays which occur when the dynamic focus signal (DFS) is amplified cannot be compensated for accurately.

SUMMARY OF THE INVENTION

To solve the above-described problems, it is an object of the present invention to provide a dynamic focus signal delay control circuit for controlling delays generated in the process where a dynamic focus signal of a CRT monitor is amplified.

It is another object of the present invention to provide a dynamic focus signal delay control method for controlling delays generated in the process where a dynamic focus signal is amplified in a CRT monitor.

To achieve the above object of the present invention, a delay control circuit according to a first embodiment of the present invention includes a pulse center detecting circuit, a first delay control signal generating circuit, and a selection circuit.

The pulse center detecting circuit generates a center detecting signal that indicates a pulse center of a first pulse signal. The first delay control signal generating circuit generates a first delay control signal having a first logic level or a second logic level depending on the result of a comparison of a first comparative signal level generated in a form of a first degree function in response to the first pulse signal with a predetermined second comparative signal level. The selection circuit selects one of the center detecting signal and the first delay control signal in response to a predetermined selection signal and generates the selected signal as a second delay control signal that controls an amount of delay time of the dynamic focus signal.

Preferably, the first delay control signal generating circuit includes a first comparative signal generating circuit and a comparative circuit. The first comparative signal generating circuit responds to the first pulse signal, recognizes a rising edge of the first pulse signal and generates the first comparative signal in a form of a first-degree function. The comparative circuit compares the level of the first comparative signal with that of the second comparative signal. If the level of the first comparative signal is larger than that of the second comparative signal, the comparative circuit generates the first delay control signal having the first logic level. On the other hand, if the level of the first comparative signal is smaller than that of the second comparative signal, the comparative circuit generates the first delay control signal having the second logic level.

The first comparative signal generating circuit includes a charge/discharge circuit which converts the first pulse signal into a current signal in response to the first pulse signal, and a capacitor which generates the first comparative signal with a triangular waveform by using an output current of the charge/discharge circuit.

The second comparative signal is a direct current signal which can be changed between the minimum and maximum levels of the first comparative signal. The center detecting signal is a signal having a phase which is changed from a low level to a high level or from a high level to a low level at a pulse center of the first pulse signal. The first pulse signal is a fly-back signal that controls the position of an electronic beam on a monitor.

The delay control circuit further includes a digital-to-analog converter that generates the second comparative signal. A point at which the first delay control signal is generated is controlled in response to changes of the second comparative signal level.

To achieve the above object of the invention, a circuit for controlling a delay of a dynamic focus signal, according to a second embodiment of the present invention, includes a first comparative signal generating circuit and a comparative circuit.

The first comparative signal generating circuit responds to the first pulse signal, recognizes a rising edge of the first pulse signal and generates the first comparative signal in a form of a first-degree function. The comparative circuit generates a delay control signal having a first logic level or a second logic level depending on the result of comparison of the first comparative signal level with a predetermined second comparative signal level.

Preferably, the first comparative signal generating circuit includes a charge/discharge circuit which converts the first pulse signal into a current signal in response to the first pulse signal, and a capacitor which generates the first comparative signal with a triangular waveform by using an output current of the charge/discharge circuit.

The second comparative signal is a direct current signal which can be changed between the minimum and maximum levels of the first comparative signal. The delay control circuit compares the first comparative signal level and the second comparative signal level, and if the first comparative signal level is larger than the second comparative signal level, the delay control signal is generated in the first logic level, and if the first comparative signal is smaller than the level of the second comparative signal, the delay control signal is generated in the second logic level, and a point at which the signal is generated is controlled in response to changes of the second comparative signal level.

The delay control circuit of a dynamic focus signal further includes a digital-to-analog converter that generates the second comparative signal. The first pulse signal is a fly-back signal that controls the position of an electronic beam on a monitor.

To achieve the second object of the present invention, there is provided a method for controlling an amount of delay of a dynamic focus signal in a CRT monitor. In this method, first, a first comparative signal having a form of a first degree function is generated by responding to a predetermined first pulse signal and recognizing a rising edge of the first pulse signal. A predetermined second comparative signal is received and compared with the first comparative signal level. If the first comparative signal level is larger than the second comparative signal level, a first delay control signal having the first logic level is generated. But, if the first comparative signal level is smaller than the second comparative signal, a first delay control signal having the second logic level is generated. The dynamic focus signal whose delay is controlled in response to the results of the first delay control signal is generated.

In the first comparative signal generation step, the first pulse signal is converted into a current signal in response to the first pulse signal, and the first comparative signal with a triangular waveform is generated by charging/discharging the current signal.

The second comparative signal is a direct current signal that changes between the minimum and maximum levels of the first comparative signal. The points at which first delay control signal is generated are controlled in response to changes of the second comparative signal level. The first pulse signal is a fly-back signal that controls the position of an electronic beam on a monitor.

In the method according to the present invention, furthermore, a center detecting signal which detects a pulse center of the first pulse signal is generated. Either the center detecting signal or the first delay control signal is selected in response to the selective signal, and the selected signal is output as the second delay control signal. The dynamic focus signal whose amount to be delayed is controlled in response to the second delay control signal is generated.

In the circuit and method for controlling a delay of a dynamic focus signal, an amount of delay time in the process where a dynamic focus signal is amplified in a CRT monitor is controlled.

BRIEF DESCRIPTION OF THE DRAWINGS

The foregoing and other objects, features and advantages of the invention will be apparent from the more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 4:
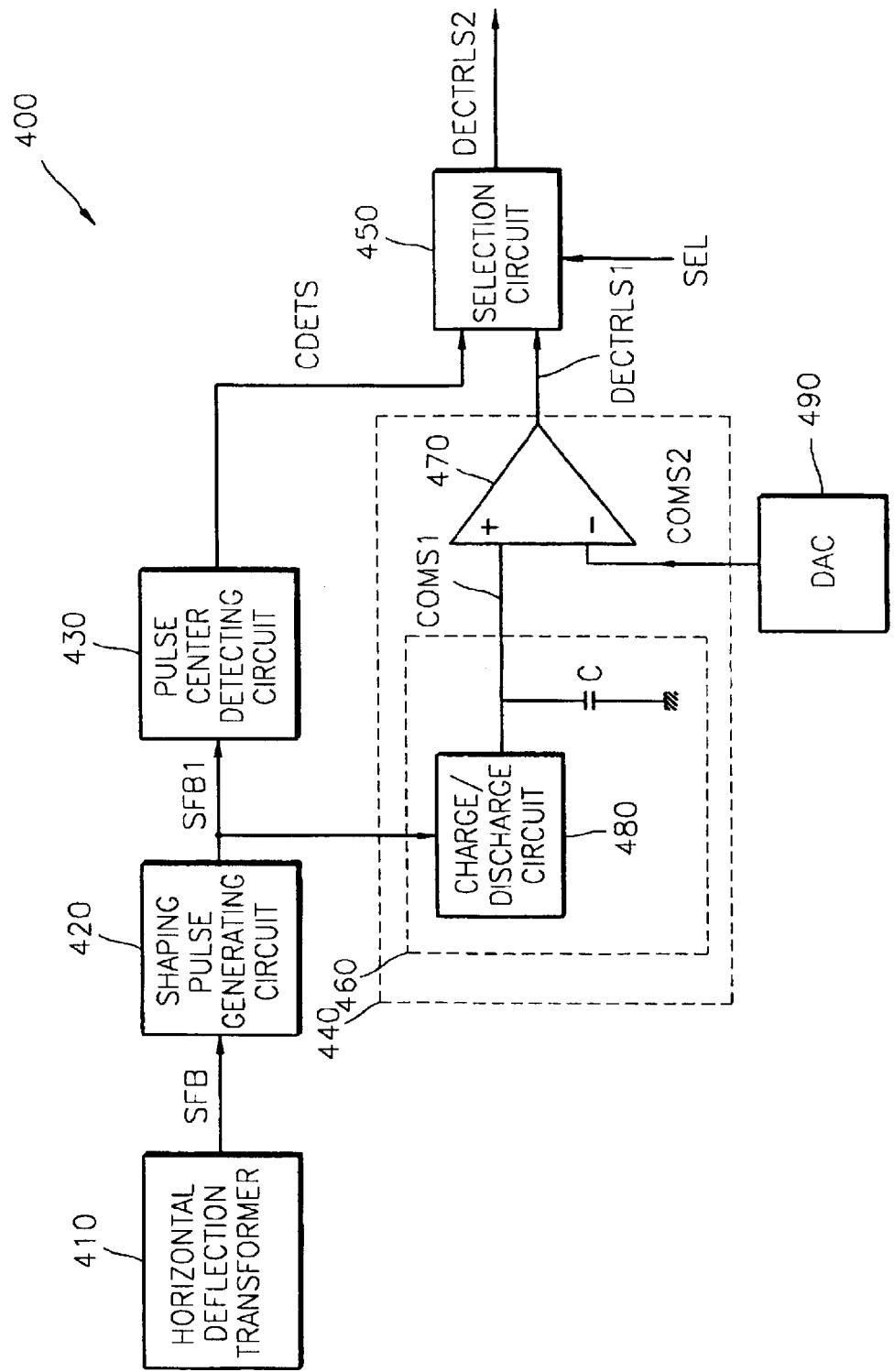
FIG. 4 is a block diagram showing a delay control circuit according to a first embodiment of the present invention.
Figure 5:
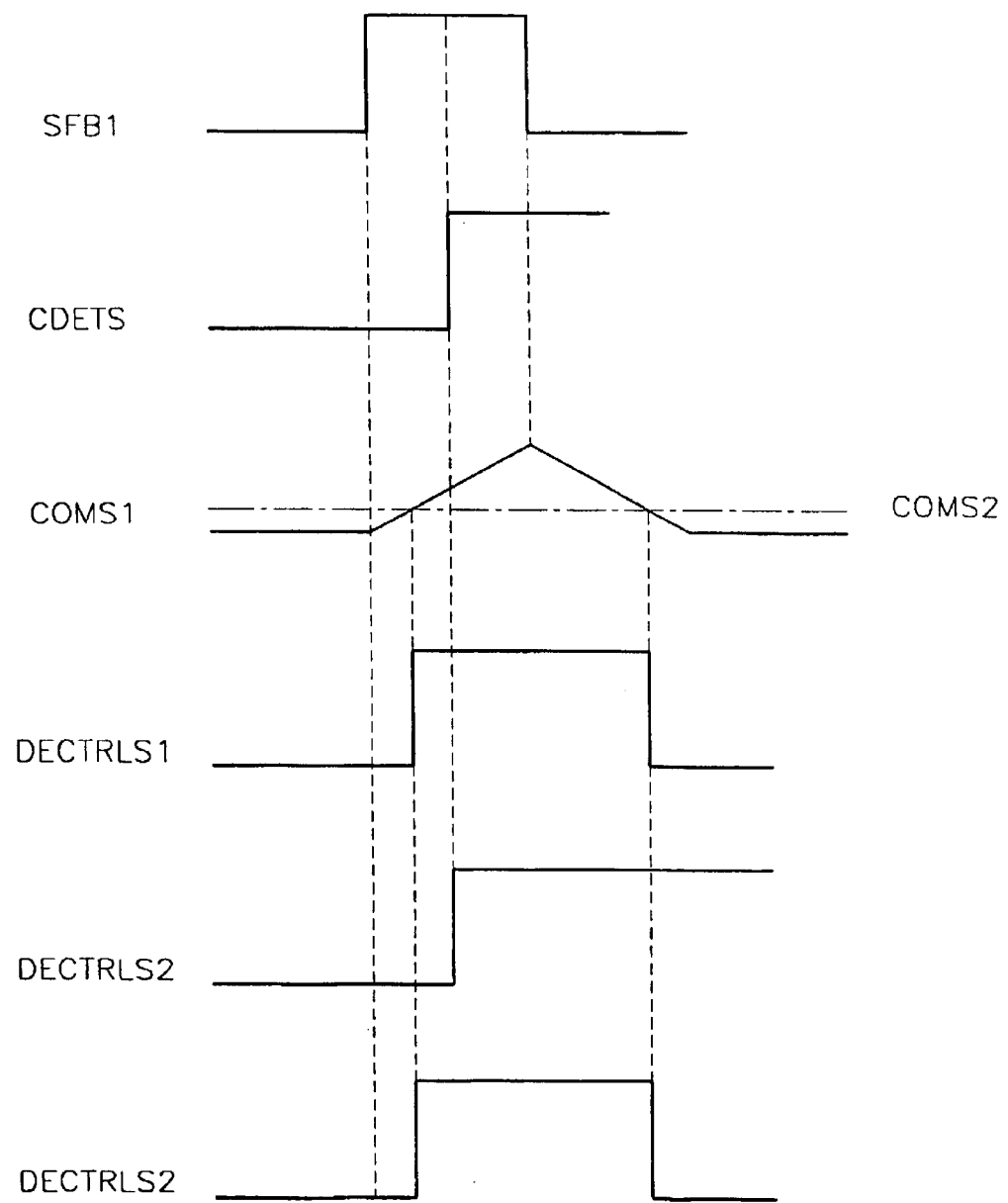
FIG. 5 is a waveform diagram showing waveforms of all the signals of FIG. 4.

FIG. 4 is a block diagram showing a delay control circuit according to a first embodiment of the present invention. FIG. 5 is a waveform diagram showing waveforms of FIG. 4.

Referring to FIG. 4, the delay control circuit 400 includes a pulse center detecting circuit 430, a first delay control signal generating circuit 440 and a selection circuit 450. The pulse center detecting circuit 430 generates a center detecting signal (CDETS) which detects the pulse center of a first pulse signal in response to a predetermined first pulse signal (SFB1). The center detecting signal (CDETS) is a signal whose phase is changed from a low level to a high level or from a high level to a low level at the center of the first pulse signal (SFB1).

The first delay control signal generating circuit 440 generates a first delay control signal (DECTRLS1) by comparing the level of a first comparative signal (COMS1) generated as a first-degree function in response to the first pulse signal (SEB1) and the level of a second comparative signal (COMS2). The first delay control signal (DECTRLS1) is either a first logic level or a second logic level depending on the comparison results.

In detail, the first delay control signal generating circuit 440 includes a first comparative signal generating circuit 460 and a comparison circuit 470. The first comparative signal generating circuit 460 generates a first comparative signal (COMS1) having a shape of a first degree function in response to a rising edge of the first pulse signal (SFB1). The first comparative signal generating circuit 460 includes a charge/discharge circuit 480 which changes the first pulse signal (SFB1) into a current signal, and a capacitor (C) which generates the first comparative signal (COMS1) which has a triangular form by using the output current of the charge/discharge circuit 480.

The comparison circuit 470 compares the level of the first comparative signal (COMS1) with that of the second comparative signal (COMS2). If the level of the first comparative signal (COMS1) is larger than that of the second comparative signal (COMS2), the comparison circuit 470 generates a first delay control signal DECTRLS1 having the first logic level. On the other hand, if the level of the first comparative signal (COMS1) is smaller than that of the second comparative signal (COMS2), the comparison circuit 470 generates a first delay control signal DECTRLS1 having the second logic level. A point at which the first delay control signal (DECTRLS1) is generated is changed in response to changes of the second comparative signal (COMS2) level.

The second comparative signal (COMS2) is a direct current signal which changes between the minimum and the maximum level of the first comparative signal (COMS1). The delay control circuit 400 further includes a digital-to-analog converter 490 which generates the second comparative signal (COMS2).

The first pulse signal (SFB1) is a fly-back signal which controls the location of the electronic beam on a monitor. The selection circuit 450 selects either the center detecting signal (CDETS) or the first delay control signal (DECTRLS1) in response to a predetermined selection signal (SEL) and controls the amount of delay of the dynamic focus signal. The selection circuit 450 outputs the selected and delayed signal as a second delay control signal (DECTRLS2).

Referring to FIGS. 4 and 5, the operation of the delay control circuit according to the first embodiment of the present invention will now be described in detail. The fly-back signal (SFB) generated by the horizontal deflection transformer 410 is input into the shaping pulse generating circuit 420. The shaping pulse generating circuit 420 generates the first pulse signal (SFB1). The first pulse signal (SFB1) is a fly-back signal (SFB) having a shaping pulse waveform as shown in FIG. 5.

The fly-back signal, i.e., the first pulse signal (SFB1), is applied to the pulse center detecting circuit 430 and the first delay control signal generating circuit 440. The pulse center detecting circuit 430 generates the center detecting signal (CDETS) which detects the pulse center of the first pulse signal (SFB1). The phase of the center detecting signal (CDETS) changes from a low level to a high level or from a high level to a low level at the pulse center of the first pulse signal (SFB1). FIG. 5 shows the phase change of a signal from a low level to a high level at the pulse center of the first pulse signal (SFB1).

The first pulse signal (SFB1) which is applied to the first delay control signal generating circuit 440 is input to the charge/discharge circuit 480 inside the first comparative signal generating circuit 460. The charge/discharge circuit 480 changes the first pulse signal (SFB1) into a current signal. The output current of the charge/discharge circuit 480 charges the capacitor (C) which is used to generate the first comparative signal (COMS1) which has a triangular waveform. The principles for generating signals that have triangular waveforms by the charge/discharge circuit 480 and the capacitor (C) are easily understood by those having a background in the art of the present invention. Thus, a description will not be provided.

In the first embodiment of the present invention, the first comparative signal (COMS1) is described as having a triangular waveform, but it may also have the form of a first degree function with a positive (+) inclination. A signal having a first degree function is generated in the form of a first degree function with a positive (+) inclination from a rising edge of the first pulse signal (SFB1). The second comparative signal (COMS2) is a direct current signal which changes between the minimum and the maximum level of the first comparative signal (COMS1). The second comparative signal (COMS2) is generated by the digital-to-analogue converter (490), and is controlled from the exterior. The first comparative signal (COMS1) and the second comparative signal (COMS2) are input to the comparison circuit 470 and compared.

The comparison circuit 470, which generates a first delay control signal (DECTRLS1), compares the levels of the first comparative signal (COMS1) and the second comparative signal (COMS2). That is, the comparison circuit 470 generates the first delay control signal (DECTRLS1) in a first logic level if the first comparative signal level is larger than the second comparative signal level and generates the DECTRLS1 signal in a second logic level if the first comparative signal level is smaller than the second comparative signal level.

FIG. 5 is a waveform diagram when the first logic level is a logic high level and the second logic level is a logic low level. However, the first logic level may be a logic high level and the second logic level may be a logic low level. The point at which the first delay control signal (DECTRLS 1) is generated can be controlled by adjusting the second comparative signal (COMS2) level from the exterior.

The first delay control signal (DECTRLS1) has a pulse waveform since the first comparative signal (COMS1) has a triangular waveform. If the first comparative signal (COMS1) has a waveform of a first degree function with a positive (+) inclination, the first delay control signal (DECTRLS1) has a waveform of a step function.

The selection circuit 450 generates the second delay control signal (DECTRLS2) in response to a predetermined selection signal (SEL) by selecting either the center detecting signal (CDETS) or the first delay control signal (DECTRLS1) and controls the amount of delay of the dynamic focus signal. The selection signal (SEL) can be controlled by a microcontroller inside a CRT monitor. When the selection signal is a logic high level, the center detecting signal (CDETS) is selected, and when the selection signal is a logic low level, the first delay control signal (DECTRLS1) is selected. However, the logic levels of the selection signal (SEL) may be opposite if the selection circuit 450 is configured differently.

The first delay control signal (DECTRLS1) is generated by comparing the first comparative signal (COMS1) which is generated by recognizing a rising edge of the first pulse signal (SFB1), and the second comparative signal (COMS2). If the level of the second comparative signal (COMS2) is the same as the minimum level of the first comparative signal (COMS1), the first delay control signal (DECTRLS1) is generated at the same time the rising edge of the first pulse signal (SFB1) is generated. If the level of the second comparative signal (COMS2) is the same as the maximum level of the first comparative signal (COMS1), the first delay control signal (DECTRLS1) is generated at the same time the falling edge of the first pulse signal (SFB1) is generated. In other words, since the second comparative signal (COMS2) is controlled from the exterior, the points at which the first delay control signal (DECTRLS1) are generated are controlled.

Therefore, if the center detecting signal (CDETS) is selected by the selective circuit 450 as the second delay control signal (DECTRLS2), a dynamic focus signal is generated at the center of the first pulse signal (SFB1). However, if the first delay control signal (DECTRLS1) is selected by the selection circuit 450 as the second delay control signal (DECTRLS2), a dynamic focus signal is generated at any location between the rising edge and the falling edge of the first pulse signal (SFB1). Therefore, since the second comparative signal (COMS2) is adjusted from the exterior, the points at which the dynamic focus signal (DFS) is generated are controlled for a certain period of time. In general, the ordinary adjusting range is considered to be the first pulse signal (SFB1), in other words, the pulse width of the fly-back signal, and is set to 0~0.15 us from the rising edge of the fly-back signal.

Figure 6:
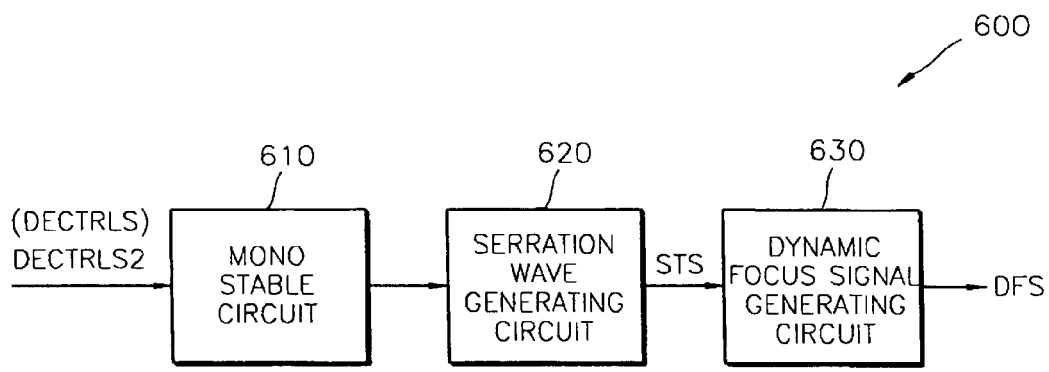
FIG. 6 is a block diagram of a circuit which generates a dynamic focus signal in response to the second delay control signal of FIG. 4.

FIG. 6 is a block diagram of circuits that generate dynamic focus signals in response to the second delay control signal (DECTRLS2) of FIG. 4.

Figure 1:
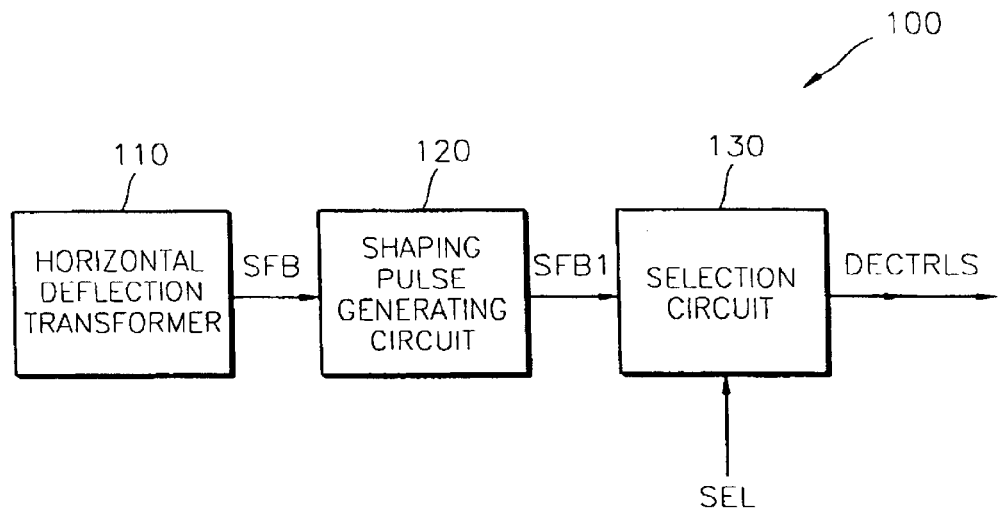
FIG. 1 is a block diagram showing a delay control circuit for controlling a delay of a conventional dynamic focus signal.
Figure 2:
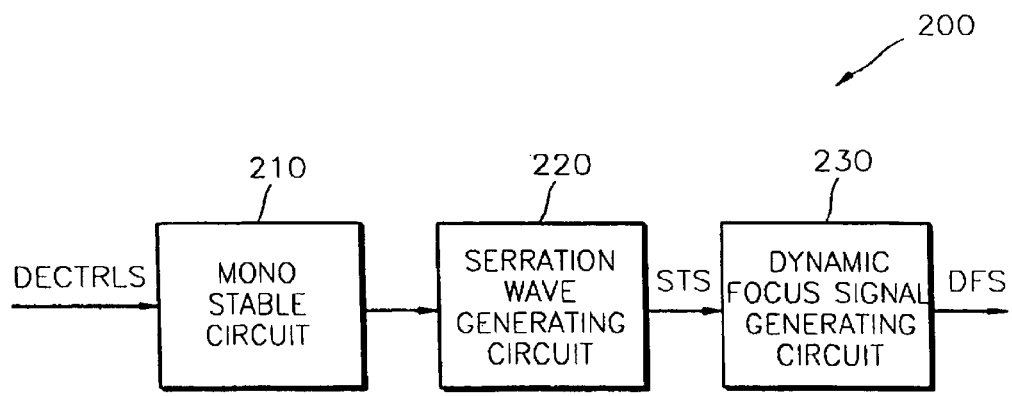
FIG. 2 is a block diagram of a circuit which generates a dynamic focus signal in response to the delay control signal.
Figure 3:
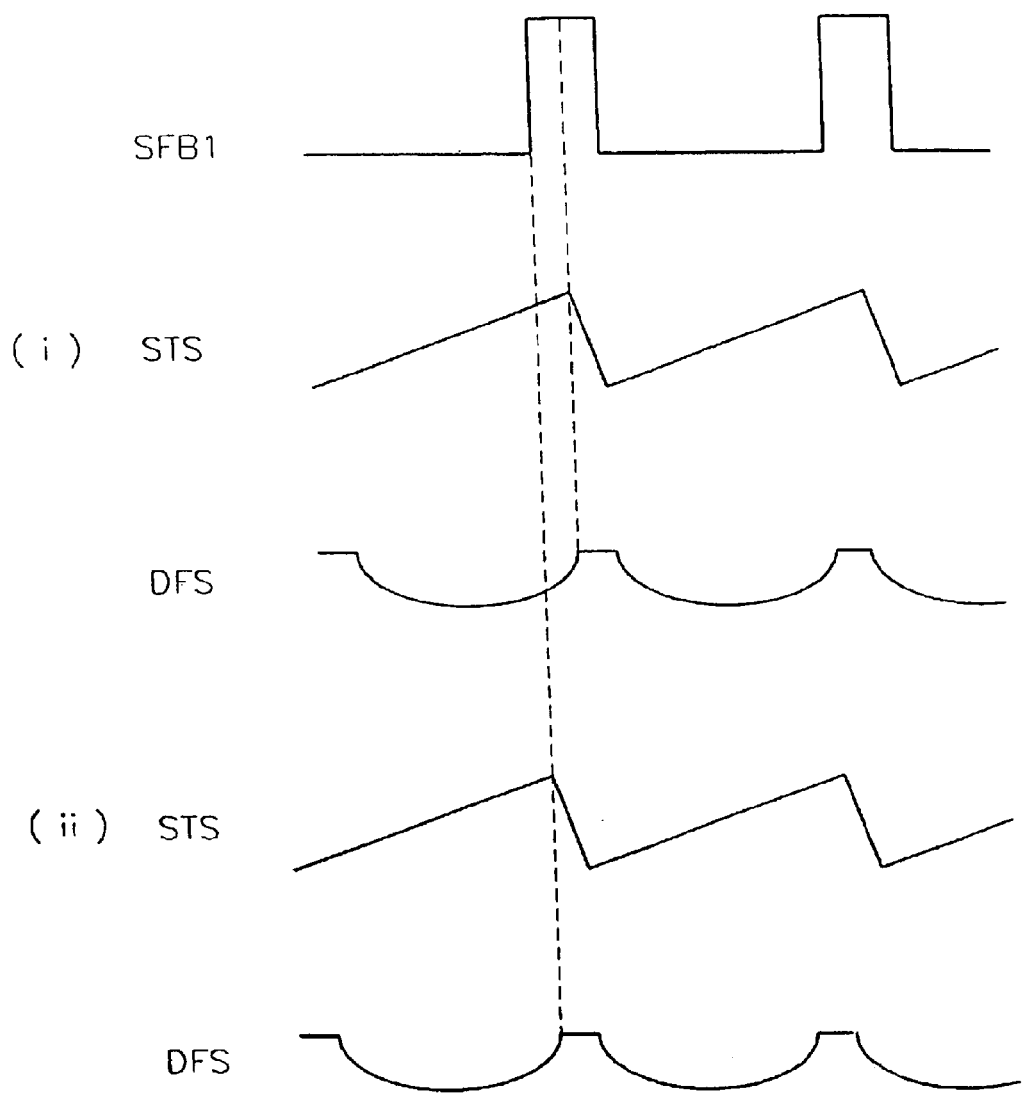
FIG. 3 is a waveform diagram showing the relationship between a fly-back signal and a dynamic focus signal.

The second delay control signal (DECTRLS2) is used to generate a dynamic focus signal (DFS) through a mono stable circuit 610, a serration wave generating circuit 620, and a dynamic focus signal generating circuit 630. The operation of these circuits has already been described with reference to the block diagram of FIG. 2, and thus an additional description thereof will not be provided.

Figure 8:
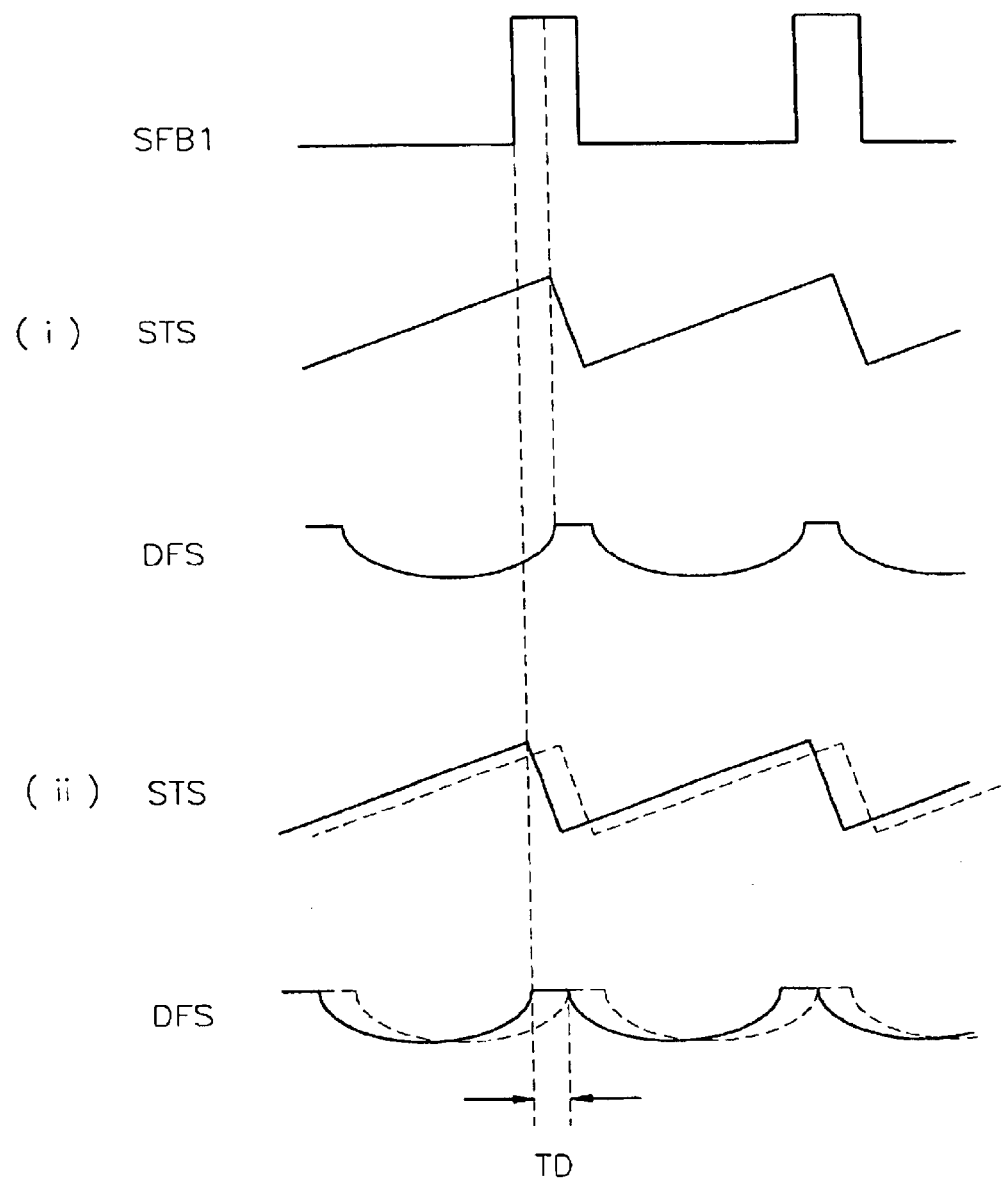
FIG. 8 is a waveform diagram showing the relationship between a first pulse signal and a dynamic focus signal of FIG. 4.

FIG. 8 is a waveform diagram showing the relationship between the first pulse signal (SFB1) of FIG. 4 and the dynamic focus signal.

FIG. 8($i$) shows a serration wave signal (STS) and a dynamic focus signal (DFS) in a case where the center detecting signal (CDETS) is selected as the second delay control signal (DECTRLS2). FIG. 8($ii$) shows a serration wave signal (STS) and a dynamic focus signal (DFS) in a case where the first delay control signal (DECTRLS1) is selected as the second delay control signal (DECTRLS2). Here, the points at which the serration wave signal (STS) and the dynamic focus signal (DFS) are generated can be controlled by adjusting the second comparative signal (COMS2) level. TD indicated in FIG. 8($ii$) indicates a period during which the dynamic focus signal (DFS) is controlled by the exterior signal.

Figure 7:
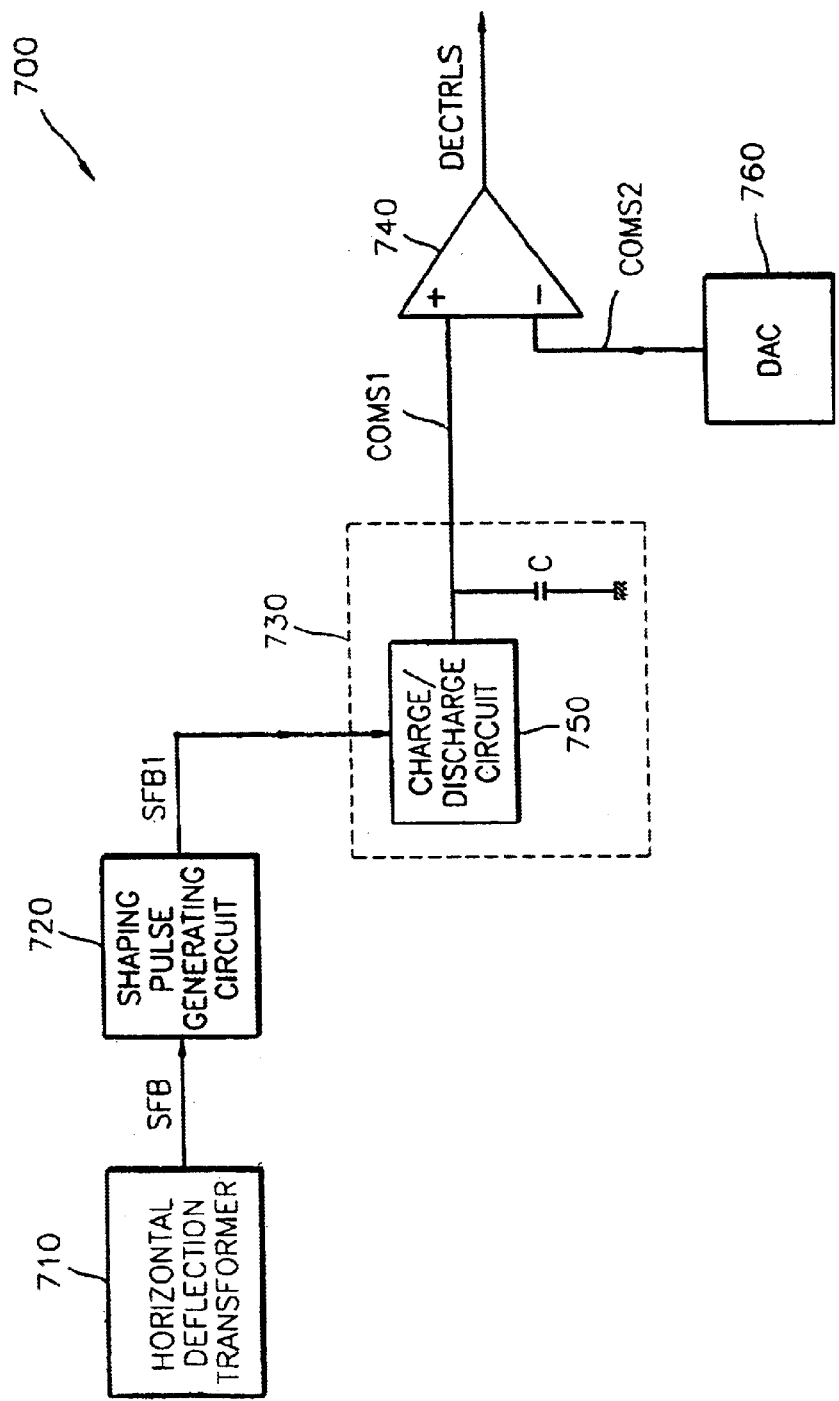
FIG. 7 is a block diagram showing a delay control circuit according to a second embodiment of the present invention.

The dynamic focus signal (DFS) generated by the delay control circuit 400 according to the first embodiment of the present invention can compensate for time delays which are generated in the process where the dynamic focus signal (DFS) is amplified in various video modes. In other words, different delays, which are generated at different frequencies of a CRT monitor, can be compensated for by the delay control circuit 400 according to the present invention. FIG. 7 is a block diagram showing a delay control circuit according to the second embodiment of the present invention.

Referring to FIG. 7, the delay control circuit 700 of the dynamic focus circuit according to the second embodiment of the present invention includes a first comparative signal generating circuit 730 and a comparison circuit 740. The first comparative signal generating circuit 730 generates a first comparative signal (COMS1) in response to a predetermined first pulse signal (SFB1). That is, the first comparative signal generating circuit 730 generates a first degree function by recognizing a rising edge of the first pulse signal (SFB1) in response to a predetermined first pulse signal. In more detail, the first pulse signal generating circuit 730 includes a charge/discharge circuit 750, which responds to the first pulse signal (SFB1) and changes the first pulse signal into a current signal, and a capacitor (C), which is charged with an output current of the charge/discharge circuit 750 to generate the first comparative signal with a triangular waveform.

The comparison circuit 740, which generates a delay control signal (DECTRLS), compares the first comparative signal (COMS1) level and a predetermined second comparative signal (COMS2) level. That is, the comparison circuit 740 outputs the first or second logic level depending on the comparison results. The second comparative signal (COMS2) is a direct current signal which changes between the minimum and the maximum levels of the first comparative signal (COMS1). The comparison circuit 740 compares the levels of the first comparative signal (COMS1) and the second comparative signal (COMS2). If the first comparative signal (COMS1) level is larger than the second comparative signal (COMS2) level the first logic level is generated as the delay control signal DECTRLS, and if the level of the first comparative signal (COMS1) is smaller than that of the second comparative signal (COMS2) the second logic level is generated. In addition, the points at which the delay control signal DECTRLS is generated are controlled in response to changes of the second comparative signal (COMS2) level.

A delay control circuit 700 of the dynamic focus signal includes a digital-to-analogue converter 760, which generates the second comparative signal. The first pulse signal (SFB1) is a fly-back signal, which controls the position of an electronic beam on the monitor.

The configuration of the delay control circuit 700 according to the second embodiment of the present invention is the same as that of the delay control circuit 400 according to the first embodiment of the FIG. 4, except that the pulse center detecting circuit 430 and the selective circuit 450 are omitted. In other words, the second comparative signal (COMS2) level is controlled from the exterior and a point at which the delay control signal (DECTRLS) is generated is controlled. Therefore, a point at which the dynamic focus signal (DFS) is generated is also controlled. The operation of the second delay control circuit 700 according to the second embodiment is described with reference to the delay control circuit 400 of the first embodiment, and thus a detailed description thereof will be omitted.

Figure 9:
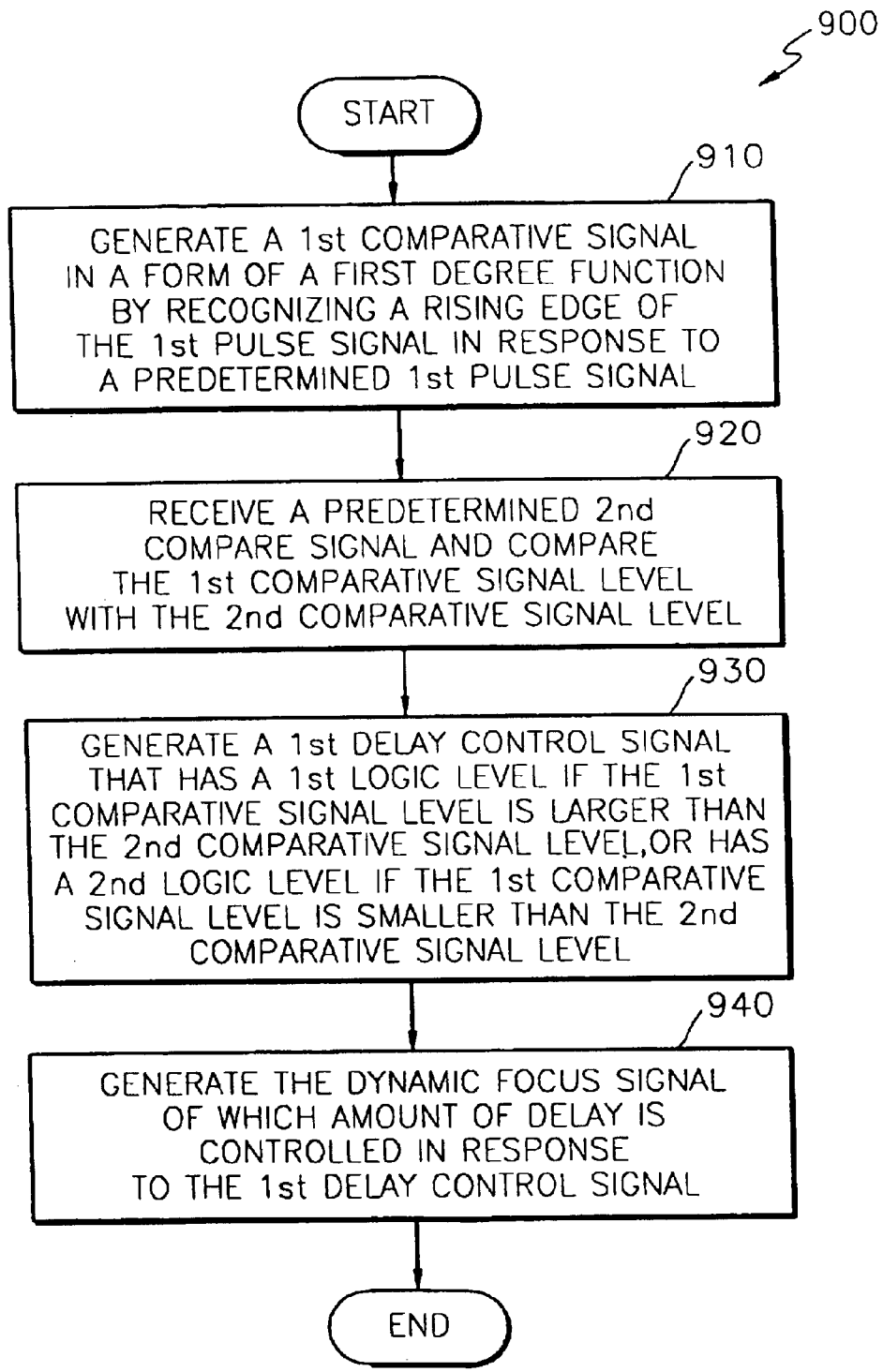
FIG. 9 is a flowchart showing a method for controlling an amount of delay of the dynamic focus signal.

FIG. 9 is a flow chart showing a method for controlling the amount of delay of the dynamic focus signal.

Figure 10:
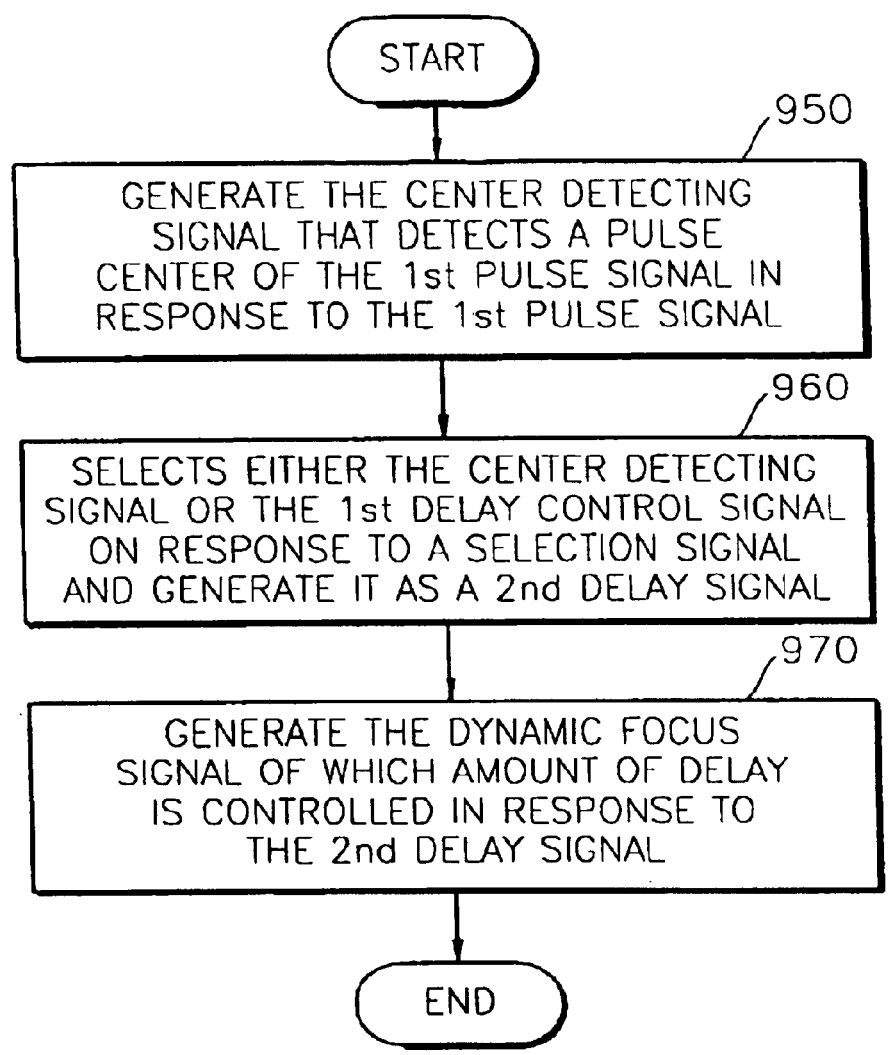
FIG. 10 is a flowchart showing a method for controlling an amount of delay of the dynamic focus signal.

FIG. 10 is a flow chart showing a method for controlling the amount of delay of the dynamic focus signal.

Referring to FIGS. 9 and 10, in a method 900 for controlling the amount of delay of the dynamic focus signal, the first comparative signal which responds to a predetermined first pulse signal is generated, a rising edge of the first pulse signal is recognized, the first comparative signal is generated, and have it in a first degree function. (step 910) Here, the first pulse signal is a fly-back signal that controls the position of an electronic beam on the CRT monitor. In more detail, step 910 includes a step for responding to the first pulse signal and changing the first pulse signal into a current signal, and a step for charging/discharging the current signal and generating the first comparative signal with a triangular waveform.

Step 920 includes receiving a predetermined second comparative signal and comparing the first comparative signal level with the second comparative signal level. The second comparative signal is a direct current signal that changes between the minimum and maximum levels of the first comparative signal.

In step 930, a first delay control signal is generated in response to the comparison in step 920 of the first comparative signal level and the second comparative signal level. If the first comparative signal level is larger than the second comparative signal level, the first logic level is generated, and if the first comparative signal is smaller than the second comparative signal level, the second logic level is generated. A point at which the first delay control signal is generated is controlled in response to changes of the second comparative signal level.

In step 940, the dynamic focus signal having a delay is generated. The amount of delay is changed in response to the first delay control signal.

The method 900 for controlling the amount of delay of the dynamic focus signal includes a step 950 for responding to the first pulse signal and generating a center detecting signal which detects a pulse center of the first pulse signal; a step 960 for selecting one of the center detecting signal and the first delay control signal in response to the selective signal and outputting the selected signal as the second delay control signal; and a step 970 for generating the dynamic focus signal which controls the amount of delay in response to the second delay control signal.

Referring to FIGS. 9 and 10, the method 900 for controlling the amount of delay of the dynamic focus signal is described in detail. First, the first comparative signal having a first degree function is generated by responding to a predetermined first pulse signal, and recognizing a rising edge of the first pulse signal. (step 910) Here, the first pulse signal is a fly-back signal which controls the location of an electronic beam on the CRT monitor. The first comparative signal is a signal in a form of a first degree function, which increases with a positive (+) inclination from a point where a rising edge of the first pulse signal is generated.

However, the first comparative signal can have a form that increases in a certain period with a positive (+) inclination and then decreases in a certain period with a certain declination. The first comparative signal according to the embodiments of the present invention is a signal which changes the first pulse signal into a current signal in response to the first pulse signal, and has a triangular waveform by charging/discharging the current signal. Those skilled in the art of the present invention can generate the first comparative signal with a triangular waveform by using a charge pump and a capacitor.

Step 920 includes receiving a predetermined second comparative signal, a direct current signal which changes between the minimum and the maximum levels of the first comparative signal, and comparing the first and second comparative signal levels.

In step 930, the first delay control signal is generated in response to the comparison in step 920 of the first comparative signal level and the second comparative signal level. If the level of the first comparative signal is larger than that of the second comparative signal the first logic level is generated, and if the level of the first comparative signal is smaller than that of the second comparative signal the second comparative signal is generated.

The first logic level and the second logic level correspond to a logic high level and a logic low level, respectively. Alternatively, the first logic level and the second logic level may correspond to a logic low level and a logic high level, respectively. If the first comparative signal has a triangular waveform, the first delay control signal is generated in a pulse waveform, and if the first comparative signal has a waveform which increases with a positive (+) inclination, the first delay control signal is generated in the form of a step function.

The point at which the first delay control signal is generated is controlled in response to changes of the second comparative signal level. In other words, the second comparative signal level is controlled from the exterior, and the point at which the first delay control signal is generated is controlled from the exterior.

The dynamic focus signal having an amount of delay which is controlled in response to the first delay control signal is generated in step 940. The point at which the first delay control signal is generated is controlled from the exterior. Thus, a point at which the dynamic focus signal is generated is controlled. Therefore, in the case of driving a CRT monitor by amplifying the dynamic focus signal, delay time can be controlled by controlling the point at which the dynamic focus signal is generated to adjust to the various frequency modes.

The above method 900 for controlling the amount of delay of the dynamic focus signal includes a method for generating the dynamic focus signal in the center of the first pulse signal.

In other words, a center detecting signal which detects a pulse center in response to the first pulse signal is generated. (step 950) The center detecting signal is a signal having a phase which is changed from a low level to a high level or from a high level to a low level at the point when the center of the first pulse signal is generated.

In step 960, the second delay control signal is generated by selecting one of the center detecting signal and the first delay control signal in response to the predetermined selective signal. One of the first delay control signal generated by the step 930 and the center detecting signal is selected according to a logic value of the selective signal and the selected signal is output as the second delay control signal.

If the first delay control signal is selected, the point at which a dynamic focus signal is generated is controlled. If the center detecting signal is selected, the dynamic focus signal is generated at a point where the center of the first pulse signal is generated. In other words, the dynamic focus signal can be generated with a certain time delay with respect to the generation of the dynamic focus signal, in response to the rising edge of the first pulse signal in step 970.

The dynamic focus signal can be generated by selecting one of the above two methods through the selection signal. The selective signal is a signal that can be controlled by the microcomputer inside the CRT monitor.

As described above, the dynamic focus signal delay control signal and method thereof have the advantage of controlling delays occurring while a dynamic focus signal of the CRT monitor is amplified.

In the drawings and specification, there have been disclosed typical preferred embodiments of the invention and although specific terms are employed, they are used in a generic and descriptive sense only and not for purpose of limitation, the scope of the invention being set forth in the following claims. While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A circuit for controlling a delay of a dynamic focus signal, the circuit comprising:
    a pulse center detecting circuit which generates a center detecting signal that detects a pulse center of a first pulse signal;
    a first delay control signal generating circuit which generates a first delay control signal having a first logic level or a second logic level depending on the result of a comparison of a first comparative signal level generated in a form of a first-degree function in response to the first pulse signal with a predetermined second comparative signal level; and
    a selection circuit selecting one of the center detecting signal and the first delay control signal in response to a predetermined selection signal and generating the selected signal as a second delay control signal that controls an amount of delay time of the dynamic focus signal.

2. The circuit of claim 1, wherein the first delay control signal generating circuit comprises:
    a first comparative signal generating circuit which responds to the first pulse signal, recognizes a rising edge of the first pulse signal and generates the first comparative signal in a form of the first-degree function; and
    a comparative circuit comparing the level of the first comparative signal with that of the second comparative signal and generating the first delay control signal having the first logic level if the level of the first comparative signal is larger than that of the second comparative signal or generating the first delay control signal having the second logic level if the level of the first comparative signal is smaller than that of the second comparative signal.

3. The circuit of claim 2, wherein the first comparative signal generating circuit comprises:
    a charge/discharge circuit which converts the first pulse signal into a current signal in response to the first pulse signal; and
    a capacitor which generates the first comparative signal with a triangular waveform by using an output current of the charge/discharge circuit.

4. The circuit of claim 1, wherein the second comparative signal is a direct current signal which is changeable between minimum and maximum levels of the first comparative signal.

5. The circuit of claim 1, wherein the center detecting signal is a signal having a phase which is changed from a low level to a high level or from a high level to a low level at a pulse center of the first pulse signal.

6. The circuit of claim 1, wherein the first pulse signal is a fly-back signal that controls the position of an electronic beam on a monitor.

7. The circuit of claim 1, further comprising a digital-to-analog converter that generates the second comparative signal.

8. The circuit of claim 1, wherein a point at which the first delay control signal is generated is controlled in response to changes of the second comparative signal level.

9. A circuit for controlling a delay of a dynamic focus signal, comprising:
    a first comparative signal generating circuit which responds to a first pulse signal, recognizes a rising edge of the first pulse signal and generates a first comparative signal in a form of a first degree function; and
    a comparative circuit which generates a delay control signal having a first logic level or a second logic level by comparing a first comparative signal level and a predetermined second comparative signal level, the delay control signal being generated in response to the results of the comparing.

10. The circuit of claim 9, wherein the first comparative signal generating circuit comprises:
    a charge/discharge circuit which converts the first pulse signal into a current signal in response to the first pulse signal; and
    a capacitor which generates the first comparative signal as a triangular waveform by using an output current of the charge/discharge circuit.

11. The circuit of claim 9, wherein a second comparative signal is a direct current signal which is changeable between the minimum and maximum levels of the first comparative signal.

12. The circuit of claim 9, wherein the comparative circuit compares the first comparative signal level and the second comparative signal level, and if the first comparative signal level is larger than the second comparative signal level, the delay control signal is generated at the first logic level, and if the first comparative signal is smaller than the level of the second comparative signal, the delay control signal is generated at the second logic level, and a point at which the delay control signal is generated is controlled in response to changes of the second comparative signal level.

13. The circuit of claim 9, further comprising a digital-to-analog converter that generates the second comparative signal.

14. The circuit of claim 9, wherein the first pulse signal is a fly-back signal that controls the position of an electronic beam on a monitor.

15. A method for controlling an amount of delay of a dynamic focus signal in a CRT (Cathode Ray Tube) monitor, comprising:

(a) generating a first comparative signal which responds to a predetermined first pulse signal, recognizes a rising edge of the first pulse signal and has a form of a first-degree function;

(b) receiving a predetermined second comparative signal and comparing a first comparative signal level with a second comparative signal level;

(c) generating a first delay control signal which responds to the result of step (b), and if the first comparative signal level is larger than the second comparative signal level, generating the first logic level, and if the first comparative signal level is smaller than the second comparative signal, generating the second logic level; and (d) generating a dynamic focus signal whose amount to be delayed is controlled in response to the results of the first delay control signal.

16. The method of claim 15, wherein generating a first comparative signal comprises:

(a1) converting the first pulse signal into a current signal in response to the first pulse signal; and (a2) generating the first comparative signal as a triangular waveform by charging/discharging the current signal.

17. The method of claim 15, wherein the second comparative signal is a direct current signal that changes between the minimum and maximum levels of the first comparative signal.

18. The method of claim 15, wherein the points at which first delay control signal is generated are controlled in response to changes of the second comparative signal level.

19. The method of claim 15, wherein the first pulse signal is a fly-back signal that controls the position of an electronic beam on a monitor.

20. The method of claim 15, further comprising:

(e) generating a center detecting signal which detects a pulse center of the first pulse signal;

(f) selecting one of the center detecting signal and the first delay control signal in response to the selective signal and outputting the selected signal as the second delay control signal; and (g) generating the dynamic focus signal, a delay of the dynamic focus signal being controlled in response to the second delay control signal.

* * * * *